United States Patent
Hsieh et al.

(10) Patent No.: US 9,260,537 B2
(45) Date of Patent: Feb. 16, 2016

(54) MODIFIED CONJUGATED DIENE RUBBER, METHOD AND COMPOSITION THEREOF

(71) Applicant: TSRC CORPORATION, Taipei (TW)

(72) Inventors: Chi-Chen Hsieh, Kaohsiung (TW); Fu Lin, Kaohsiung (TW); Chi-Ta Tsai, Kaohsiung (TW); Hui-Kai Lin, Taichung (TW); Bo-Han Lin, Taichung (TW)

(73) Assignee: TSRC Corporation, Taipei (TW)

( * ) Notice: Subject to any disclaimer, the term of this patent is extended or adjusted under 35 U.S.C. 154(b) by 595 days.

(21) Appl. No.: 13/654,839

(22) Filed: Oct. 18, 2012

(65) Prior Publication Data
US 2013/0158192 A1 Jun. 20, 2013

Related U.S. Application Data

(60) Provisional application No. 61/576,140, filed on Dec. 15, 2011.

(30) Foreign Application Priority Data

Jul. 26, 2012 (TW) .............................. 101126913 A

(51) Int. Cl.
| | |
|---|---|
| C08C 19/22 | (2006.01) |
| C08C 19/44 | (2006.01) |
| C08F 8/30 | (2006.01) |
| C08F 36/08 | (2006.01) |
| C08F 4/56 | (2006.01) |
| C08F 36/04 | (2006.01) |
| C08F 36/06 | (2006.01) |
| C08C 19/25 | (2006.01) |
| C08K 3/36 | (2006.01) |

(52) U.S. Cl.
CPC ................ C08C 19/44 (2013.01); C08C 19/22 (2013.01); C08C 19/25 (2013.01); C08F 4/56 (2013.01); C08F 8/30 (2013.01); C08F 36/04 (2013.01); C08F 36/06 (2013.01); C08F 36/08 (2013.01); C08K 3/36 (2013.01)

(58) Field of Classification Search
CPC ........ C08C 19/44; C08C 19/22; C08C 19/25; C08F 8/30; C08F 36/08; C08F 36/04; C08F 36/06; C08F 4/56; C08K 3/36
See application file for complete search history.

(56) References Cited

U.S. PATENT DOCUMENTS

2008/0171827 A1 * 7/2008 Hogan et al. ................. 524/570
2010/0130664 A1 5/2010 Rachita et al.

FOREIGN PATENT DOCUMENTS

| EP | 2266819 A1 | 12/2010 |
|---|---|---|
| EP | 2407507 A1 | 1/2012 |
| EP | 2476709 A1 | 7/2012 |
| EP | 2565208 A2 | 3/2013 |
| JP | 2001-106830 A | 4/2001 |
| JP | 2008-195923 A | 8/2008 |
| KR | 10-2008-0063181 A | 7/2008 |
| WO | 2010/104149 A1 | 9/2010 |
| WO | 2011/030833 A1 | 3/2011 |

OTHER PUBLICATIONS

Taiwanese Office Action mailed Mar. 17, 2013 in counterpart Taiwanese Application No. 101126913.
European Search Report mailed Mar. 18, 2013 in counterpart European Application No. 12190409.8.
Korean Office Action mailed Feb. 12, 2014 in counterpart Korean Application No. 10-2012-0124422.

* cited by examiner

*Primary Examiner* — Peter D Mulcahy
(74) *Attorney, Agent, or Firm* — Snell & Wilmer L.L.P.

(57) ABSTRACT

A method of forming modified conjugated diene rubber includes (a) reacting an alkali metal ion-containing conjugated diene rubber with a first modifier having a structural formula (I),

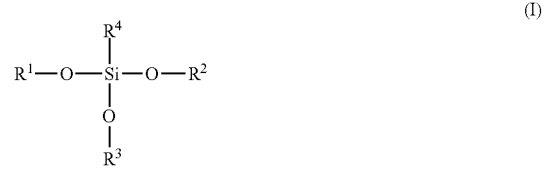

wherein $R^1$, $R^2$, $R^3$ are each independently selected from the group consisting of $C_1$-$C_{12}$ of alkyl and $C_2$-$C_{12}$ of alkenyl groups and $C_6$-$C_{12}$ of aromatic group, and $R^4$ is selected from the group consisting of $C_1$-$C_{12}$ of alkyl, $C_2$-$C_{12}$ of alkenyl, $C_1$-$C_{12}$ of alkoxy groups and $C_6$-$C_{12}$ of aromatic group; and (b) adding a second modifier having a structural formula (II) after (a), $$HO-R^5-Y \qquad (II)$$

wherein $R^5$ is selected from the group consisting of $C_1$-$C_{12}$ of alkylene, $C_2$-$C_{12}$ of alkenylene, $C_3$-$C_{12}$ of alicyclic groups and $C_6$-$C_{12}$ of aromatic group, and Y is selected from the group consisting of oxygen-containing $C_1$-$C_{12}$ group and nitrogen-containing, $C_1$-$C_{12}$ group, wherein Y has the oxygen atom or the nitrogen atom directly connected to a carbon atom of $R^5$.

22 Claims, No Drawings

MODIFIED CONJUGATED DIENE RUBBER, METHOD AND COMPOSITION THEREOF

CROSS REFERENCE TO RELATED APPLICATION

This application claims the right of priority based on U.S. Provisional Application No. 61/576,140 entitled "CONJUGATED DIENE RUBBER CONTAINED POLAR ALKOXYSILYL, GROUP, METHOD AND COMPOSITION THEREOF," filed on Dec. 15, 2011; and the right of priority based on Taiwan Patent Application No. 101126913 entitled "MODIFIED CONJUGATED DIENE RUBBER, METHOD AND COMPOSITION THEREOF," filed on Jul. 26, 2012, both of which are incorporated herein by reference and assigned to the assignee herein.

FIELD OF INVENTION

The present invention relates to a conjugated diene rubber, and more particularly, to a conjugated diene rubber modified with two kinds of modifiers.

BACKGROUND OF THE INVENTION

Solution styrene butadiene rubbers (SSBR) are synthetic products consisting of butadiene and styrene unit made by solution polymerization method. Industrial production of the solution SBR was first proposed by the U.S. company, Phillips, in batch process and Firestone company in continuous process. Since the solution SBR is superior to the emulsion SBR (ESBR) in mechanical properties and rolling resistance, the solution SBR is widely used by the automotive industry and in other rubber products.

With the increasing requirements for cars with low fuel economy, demands on tire rubber materials for such characteristic requirements also increase. Conjugated diene based rubbers with low rolling resistance, excellent wear resistance, and balanced wet-skid resistance provide excellent steering stability, leading to the increase in demand. On the other hand, the industry has proposed to add silica compounds or mixture of silica compounds and carbon black as a reinforcing agent to a rubber composition. Tire treads containing compounds with mixture of silica and carbon black or silica compounds are favorable with low rolling resistance and wet-skid resistance, so as to provide excellent steering stability.

In order to achieve a better bond between the conjugated diene rubber and the reinforcing agent, the industry has developed lots of techniques for modified conjugated diene rubber. Of the related technical publications, U.S. Pat. No. 4,185,042 discloses a coupling agent used for SBS block copolymer. Lithium-containing polymer reacts with the silicon-containing coupling agent, thereby obtaining the SBS block copolymer with the coupling ratio >90% and no Si—OR group presented in the SBS block copolymer. U.S. Pat. No. 5,219,938 discloses a two-stage modification process. By using two kinds of modifiers, the chain ends of lithium-containing diene polymer molecules react with the coupling agent $R_nSiCl_{4-n}$ or $R_nSnCl_{4-n}$ to perform a first modification, and then with the coupling agent, $R^5R^6R^7$—Si—$(CH_2)_n$—N—$R^8R^9$, to perform a second modification. U.S. Pat. No. 7,288,594 discloses a two-step modification of lithium-containing styrene-butadiene rubber by using two different kinds of silane compounds. In addition, U.S. Pat. No. 7,807,747 discloses a two-step modification of lithium-containing styrene-butadiene rubber by using same silane compound.

However, the processes of the above-mentioned related arts are mostly complicated and difficult to practice. Therefore, there is a need of a novel modification technique for conjugated diene rubber to overcome the problems of conventional arts.

SUMMARY OF THE INVENTION

One aspect of the present invention is to provide a method for producing a modified conjugated diene rubber, the method including: (a) reacting an alkali metal ion-containing conjugated diene rubber with a first modifier having a structural formula (I):

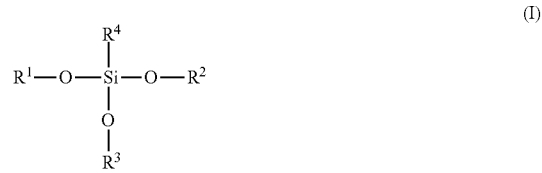

wherein $R^1$, $R^2$, $R^3$ are each independently selected from the group consisting of $C_1$-$C_{12}$ of alkyl and $C_1$-$C_{12}$ of alkenyl groups and $C_6$-$C_{12}$ of aromatic group, and $R^4$ is selected from the group consisting of $C_1$-$C_{12}$ of alkyl, $C_2$-$C_{12}$ of alkenyl, $C_1$-$C_{12}$ of alkoxy groups and $C_6$-$C_{12}$ of aromatic group; and (b) adding a second modifier having a structural formula (II) after the step (a),

wherein $R^5$ is selected from the group consisting of $C_1$-$C_{12}$ of alkylene, $C_2$-$C_{12}$ of alkenylene, $C_3$-$C_{12}$ of alicyclic groups and $C_6$-$C_{12}$ of aromatic group, and Y is selected from the group consisting of oxygen-containing $C_1$-$C_{12}$ group and nitrogen-containing $C_1$-$C_{12}$ group, wherein Y has the oxygen atom or the nitrogen atom directly connected to a carbon atom of $R^5$.

Another aspect of the present invention is to provide a modified conjugated diene rubber made by the method described above and a composition of conjugated diene rubber including the modified conjugated diene rubber and a silica.

In yet another aspect of the present invention is to provide a modified conjugated diene rubber and a composition of conjugated diene rubber including the modified conjugated diene rubber and a silica. The modified conjugated diene rubber represented by the following structural formula (III) or (IV):

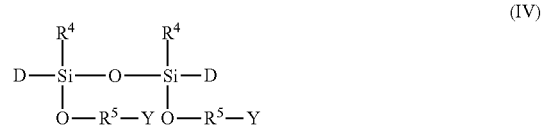

wherein D is a polymer chain of conjugated diene monomer or of conjugated diene monomer and vinyl aromatic hydrocarbon monomer; $R^4$ is selected from the group consisting of $C_1$-$C_{12}$ of alkyl, $C_2$-$C_{12}$ of alkenyl, $C_1$-$C_{12}$ of alkoxy groups and $C_6$-$C_{12}$ of aromatic group; $R^5$ is selected from the group consisting of $C_1$-$C_{12}$ of alkylene, $C_2$-$C_{12}$ of alkenylene, $C_3$-$C_{12}$ of alicyclic groups and $C_6$-$C_{12}$ of aromatic group; and Y is selected from the group consisting of oxygen-containing $C_1$-$C_{12}$ group and nitrogen-containing $C_1$-$C_{12}$ group, wherein Y has the oxygen atom or the nitrogen atom directly connected to a carbon atom of $R^5$.

Other aspects and various embodiments included in the present invention to solve other problems and combined with the above aspects are disclosed in the following detailed description.

DETAILED DESCRIPTION OF THE INVENTION

The preferred embodiments of the present invention will now be described in greater details. Descriptions of well-known components, materials and process techniques are omitted so as to not unnecessarily obscure the embodiments of the invention. The present invention is described with reference to the illustrative embodiments; these descriptions should not be construed in a limiting sense. Various modifications of the illustrative embodiment, as well as other embodiments of the invention, will be apparent upon reference to these descriptions. It is therefore contemplated that the appended claims will cover any such modifications or embodiments as falling within the true scope of the invention and its legal equivalents.

Polymerization: Formation of Alkali Metal Loan-Containing Conjugated Diene Rubber In the present invention, the method for producing the alkali metal ion-containing conjugated diene rubber includes polymerizing conjugated diene monomers or conjugated diene monomers and vinyl aromatic hydrocarbon monomers in a suitable solvent by anionic polymerization using an organic alkali metal compound as the initiator to obtain the alkali metal ion-containing conjugated diene rubber.

The polymers used in the present invention can be polymers of conjugated diene monomers or copolymers of conjugated diene monomers (e.g., butadiene or isoprene) and vinyl aromatic hydrocarbon monomers (e.g., styrene or methyl styrene). The monomers used in the present invention are not limited to butadiene, isoprene and styrene; other suitable derivatives are also applicable in the present invention. For example, the conjugated diene monomer can be independently selected from the group consisting essentially of: 1,3-butadiene, 2,3-dimethyl-, 3-butadiene, 3-butyl-1,3-octadiene, isoprene, 1-methylbutadiene, 2-phenyl-1,3-butadiene and any combination thereof. The vinyl aromatic hydrocarbon monomer can be independently selected from the group consisting essentially of styrene, methylstyrene and all isomers thereof, ethylstyrene and all isomers thereof, cyclohexylstyrene, vinyl biphenyl, 1-vinyl-5-hexyl naphthalene, vinyl naphthalene, vinyl anthracene and any combination thereof.

During polymerization, the preferable option is to use organic lithium compounds as an initiator, thereby obtaining the alkali metal ion-containing conjugated diene rubber having activated carbon-lithium ion in the polymer chain end. The specific examples of organolithium initiators include n-propyl lithium, isopropyl lithium, n-butyl lithium, sec-butyl lithium, tert-butyl lithium, amyl lithium, phenyl lithium, tolyl lithium and the likes, wherein n-butyl lithium is preferred.

Solvents suitable for polymerization include such as inert organic solvents, wherein the inert organic solvents do not involve in the polymerization reaction. Examples of such solvents include aliphatic hydrocarbon compounds such as butane, isobutane, n-pentane, isopentane, 2,2,4-trimethyl pentane, iso-hexane, n-hexane, iso-heptane, n-heptane, iso-octane and n-octane; or naphthenic family such as cyclohexane, methyl cyclohexane, ethyl cyclohexane, cyclopentane, cycloheptane, methyl cyclopentane; or aromatic compounds such as benzene, toluene, xylene, ethylbenzene, diethylbenzene and propylbenzene, wherein cyclohexane is preferred in the present invention. The polymer concentration of the conjugated diene rubber is generally in a range of 5% to 35%, preferably in a range of 10% to 30%. In general, if the inert organic solvent is simply used as the polymerization medium, the polymerization rate of vinyl aromatic hydrocarbons or conjugated dienes is slow and the polymerization reactivity between the two is quite different. Such difference can be overcome by way of adding polar solvents. The specific examples of applicable polar solvents of the invention include tetramethylethylenediamine and ethers compounds such as tetrahydrofuran, diethyl ether, cyclopentyl ether, dipropyl ether, ethylene glycol dimethyl ether, ethylene glycol diethyl ether, diethylene glycol, dimethyl ether and methyl ethyl ether, wherein tetrahydrofuran and diethyl ether are preferred in the present invention.

The initial polymerization temperature can be in a range of 10° C. to 80° C. The final polymerization temperature can be in a range of 30° C. to 150° C. The temperature control methods can include adiabatic reaction, constant temperature control, or partial cooling control.

In each embodiment of the present invention, the initial number-average molecular weight (Mi) of the polymer after polymerization but before reaction with the modifier is in a range of 80 kg/mole to 2000 kg/mole, preferably in a range of 100 kg/mole to 1500 kg/mole, and more preferably in a range of 150 kg/mole to 1000 kg/mole. The measurement of number-average molecular weight can be performed by means of gel permeation chromatography (GPC), which is well-known in the art.

Adding Modifier

The modification process of the present invention involves two kinds of modifiers to form the modified conjugated diene rubber. The method for producing a modified conjugated diene rubber includes: (a) reacting an alkali metal ion-containing conjugated diene rubber with a first modifier having a structural formula (I):

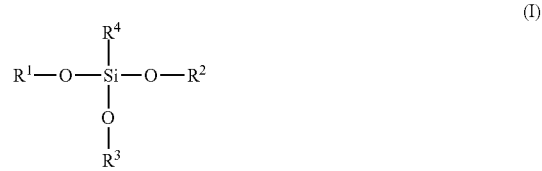

(I)

wherein from the formula (I), it can be seen that the first modifier is an alkoxysilane, wherein $R^1$, $R^2$, $R^3$ are each independently selected from the group consisting of $C_1$-$C_{12}$ of alkyl, $C_2$-$C_{12}$ of alkenyl groups and $C_6$-$C_{12}$ of aromatic group, and $R^4$ is selected from the group consisting of $C_1$-$C_{12}$ of alkyl, $C_2$-$C_{12}$ of alkenyl, $C_1$-$C_{12}$ of alkoxy groups and $C_6$-$C_{12}$ of aromatic group. In each embodiment of the first modifier of the present invention, the examples of alkyl group of $R^1$, $R^2$, $R^3$ and $R^4$ include methyl, ethyl, propyl, isopropyl, n-butyl, isobutyl, t-butyl, hexyl, 2-ethylhexyl; the examples of alkenyl group of $R^1$, $R^2$, $R^3$ and $R^4$ include vinyl, propenyl, n-butenyl, iso-butenyl, pentenyl, hexenyl; the examples of aromatic group of $R^1$, $R^2$, $R^3$ and $R^4$ include phenyl, tolyl, ethylphenyl, xylyl, propylphenyl; the examples of alkoxy group of $R^4$ include methoxy, ethoxy, propoxy, n-butoxy, isobutoxy, in particular, the most preferred example of $R_1$, $R^2$, $R^3$ and $R^4$ is trimethoxy(methyl)silane.

The alkali metal ion-containing conjugated diene rubber of step (a) can be a polymer formed from the polymerization process as described above or any suitable polymer formed by any method. During the modification process of step (a), the first modifier is connected to the diene chain end of the alkali metal ion-containing conjugated diene rubber. The molar ratio of first modifier to alkali metal ion-containing conjugated diene rubber is ≥0.5, preferably ≥0.6, and more preferably ≥0.7, but should be less than 10.

The modification method of the present invention further includes (b) adding a second modifier having a structural formula (II) after the step (a),

HO—$R^5$—Y     (II)

wherein $R^5$ is selected from the group consisting of $C_1$-$C_{12}$ of alkylene, $C_2$-$C_{12}$ of alkenylene, $C_3$-$C_{12}$ of alicyclic groups and $C_6$-$C_{12}$ of aromatic group, and Y is selected from the group consisting of oxygen-containing $C_1$-$C_{12}$ group and nitrogen-containing $C_1$-$C_{12}$ group, wherein Y has the oxygen atom or the nitrogen atom directly connected to a carbon atom of $R^5$. From the formula (II), it can be seen that the second modifier is an alcohol having oxygen or nitrogen atom. The examples of alkylene group of $R^5$ include ethylene (—$CH_2CH_2$—), propylene (—$CH_2CH_2CH_2$—), butylene (—$CH_2CH_2CH_2CH_2$—); the examples of alkenylene group of $R^5$ include vinylene (—CH=CH—), propenylene (—CH=CHCH_2—), butenylene (—CH=CHCH_2CH_2—), hexenylene (—$CH_2$CH=CHCH_2CH_2CH_2—); the examples of aromatic group of $R^5$ include phenyl, tolyl, ethylphenyl, xylyl, propylphenyl; the examples of alicyclic group of $R^5$ include cyclopropyl, cyclobutyl, cyclopentyl, cyclohexyl, cycloheptyl. In a preferred embodiment where Y is oxygen-containing $C_1$-$C_{12}$ group, Y can have a $C_1$-$C_{12}$ alkyl, $C_2$-$C_{12}$ alkenyl, or $C_6$-$C_{12}$ aromatic group connected to the oxygen atom, i.e. the oxygen forms a linking group between $R^5$ and a carbon of Y. The examples of oxygen-containing $C_1$-$C_{12}$ group of Y include methoxy, ethoxy, propoxy, n-butoxy, isobutoxy. In a preferred embodiment where Y is nitrogen-containing $C_1$-$C_{12}$ group, Y can have one or more $C_1$-$C_{12}$ alkyl, $C_2$-$C_{12}$ alkenyl, or $C_6$-$C_{12}$ aromatic group connected to the nitrogen atom, i.e. the nitrogen forms a linking group between $R^5$ and one or more carbons of Y. The examples of nitrogen-containing $C_1$-$C_{12}$ group of Y include diethylamino, dimethylamino, methylethylamino. The examples of alkyl, aromatic, alkenyl groups can be referred to the descriptions of the modification described above. In particular, the second modifier is preferably 3-methoxyphenol or dimethylaminoethanol. The molar ratio of second modifier to alkali metal ion-containing conjugated diene rubber is ≥0.5, preferably ≥0.6, and more preferably ≥0.7, but should be less than 10.

Reaction with Water

In one embodiment of the present invention, after adding the first modifier and the second modifier, the modified conjugated diene rubber can be contacted with water, wherein the weight ratio of modified conjugated diene rubber to water can be changed as appropriate. If it intends to improve the stability of Mooney viscosity, a large amount of water can be employed. The method of contacting the modified conjugated diene rubber with water includes steam stripping and other suitable methods. For steam stripping as an example, the solution of solvent and modified conjugated diene rubber can contact water at a temperature controlled under 90° C., wherein the weight ratio of water to solvent of the solution is at least 0.1, preferably at least 0.5, and more preferably at least 1; the pH value is between 6 and 10. Contact temperature of the two can be 20° C. to 150° C., preferably 30° C. to 140° C., and more preferably 40° C. to 130° C. Contact time of the two can be 5 minutes to 10 hours, preferably 10 minutes to 8 hours, and more preferably 30 minutes to 6 hours. Steam, electric, hot air, or other heat source treatment can be implemented to remove the solvent simultaneously or after the modified conjugated diene rubber contacting water. Other well-known drying treatments such as mechanical dewatering, oven drying, or apron drying can be subsequently performed. Alternatively, the rubber can be dried at 110° C. by hot roll treatment. The coupling ratio of the modified conjugated diene rubber after water contact treatment is 10%-95%, preferably 20%-80%, more preferably 25%-75, and most preferably 30%-70%.

Though the above embodiment illustrates that the water contact treatment is preformed after the reaction of the conjugated diene rubber with the first modifier and the addition of the second modifier, the timing of performing the water contact treatment is not limited thereto. In another embodiment, water and the second modifier can be added simultaneously by any suitable methods; in yet another embodiment, the water contact treatment can be performed after the reaction of conjugated diene rubber with the first modifier and before the addition of the second modifier. For example, steam stripping can be performed after the reaction of conjugated diene rubber with the first modifier, and the second modifier is added during the steam stripping. Alternatively, steam stripping can be performed after the reaction of conjugated diene rubber with the first modifier, and the second modifier is added after the completion of steam stripping.

Modification Mechanism

The mechanism of the modification process described above can be reasonably given as follows:

Step (a): Reacting an Alkali Metal Ion-Containing Conjugated Diene Rubber with a First Modifier

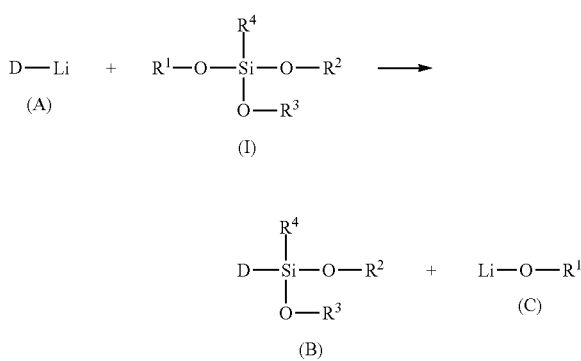

wherein the formula (A) represents a conjugated diene rubber-lithium (Li); D in the formula (A) represents a polymer chain of conjugated diene monomer or of conjugated diene monomer and vinyl aromatic hydrocarbon monomer. After reacting with the first modifier of alkoxysilane (I), the lithium ion is substituted by the first modifier of alkoxysilane (I) to produce a pretreated conjugated diene rubber having alkoxysilane group (B).

Step (b): Adding a Second Modifier (II) after Step (a) Provided that the Second Modifier is Merely Mixed in the Polymer Solution and No Modification has Occurred.

Step (c): Adding Water to Generate Hydrolysis Reaction.

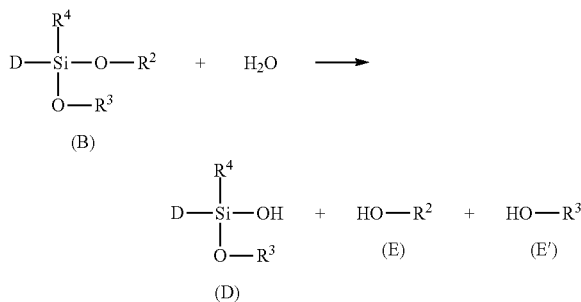

During the water contact treatment (e.g. steam stripping), the pretreated conjugated diene rubber having alkoxysilane group (B) will experience hydrolysis to form the hydrolysis product (D).

Step (d): Reacting the Hydrolysis Product (D) with a Second Modifier (II)

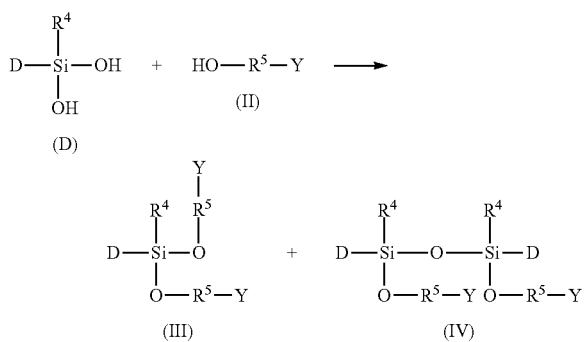

The hydrolysis product (D) reacts with the second modifier (II) to produce a nitrogen or oxygen-containing conjugated diene rubber having alkoxysilane group, such as a polymer having the structural formula (III) or (IV). For the above mechanism, it can gather that the alkoxysilane group is introduced into the conjugated diene rubber by the first modifier, and then the nitrogen or oxygen atom is introduced into the conjugated diene rubber having the alkoxysilane group.

Modified Conjugated Diene Rubber

After modification as described above, the modified conjugated diene rubber is produced and represented by the following structural formula (III) or (IV):

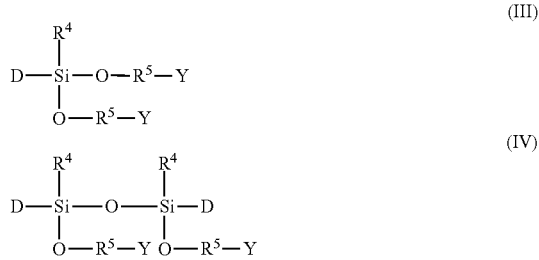

wherein D is a polymer chain of conjugated diene monomer or of conjugated diene monomer and vinyl aromatic hydrocarbon monomer; $R^4$ is selected from the group consisting of $C_1$-$C_{12}$ of alkyl, $C_2$-$C_{12}$ of alkenyl, $C_1$-$C_{12}$ of alkoxy groups and $C_6$-$C_{12}$ of aromatic group; $R^5$ is selected from the group consisting of $C_1$-$C_{12}$ of alkylene, $C_2$-$C_{12}$ of alkenylene, $C_3$-$C_{12}$ of alicyclic groups and $C_6$-$C_{12}$ of aromatic group; and Y is selected from the group consisting of oxygen-containing $C_1$-$C_{12}$ group and nitrogen-containing $C_1$-$C_{12}$ group, wherein Y has the oxygen atom or the nitrogen atom directly connected to a carbon atom of $R^5$. In a preferred embodiment, $R^4$ is methyl group. In a preferred embodiment where Y is oxygen-containing $C_1$-$C_{12}$ group, Y can have a $C_1$-$C_{12}$ alkyl, $C_2$-$C_{12}$ alkenyl, or $C_6$-$C_{12}$ aromatic group connected to the oxygen atom, i.e. the oxygen forms a linking group between $R^5$ and a carbon of Y. In a preferred embodiment where Y is nitrogen-containing $C_1$-$C_{12}$ group, Y can have one or more a $C_1$-$C_{12}$ alkyl, $C_2$-$C_{12}$ alkenyl, or $C_6$-$C_{12}$ aromatic groups connected to the nitrogen atom, i.e. the nitrogen forms a linking group between $R^5$ and one or more carbons of Y. The examples of alkyl, aromatic, alkenyl, or alicyclic group can be referred to the descriptions of the modification described above, in particular, —O—$R^5$—Y in the structural formula (III) and the structural formula (IV) is preferably —O—($C_6H_4$)—$OCH_3$ or —O—$CH_2CH_2N(CH_3)_2$.

Composition of Conjugated Diene Rubber

The modified conjugated diene rubber of the present invention may be used in a composition of conjugated diene rubber by mixing another rubber component therewith. Examples of said other rubber component include conventional styrene-butadiene copolymer rubber, polybutadiene rubber, butadiene-isoprene copolymer rubber and butyl rubber. Specific examples further include natural rubber, ethylene-propylene copolymer rubber and ethylene-octene copolymer rubber. These components may be used in a mixture of two or more types. In the case where another rubber component is mixed with the modified conjugated diene rubber of the present invention, the amount of modified conjugated diene rubber of the present invention combined is preferably at least 10 parts by weight and more preferably at least 20 parts by weight when the total amount of rubber components combined is 100 parts by weight.

Furthermore, the composition of conjugated diene rubber of the present invention may include an additive. Specific examples of the additive include a vulcanizing agent such as sulfur; a vulcanization accelerator such as a thiazole-based vulcanization accelerator, a thiuram-based vulcanization accelerator, or a sulfenamide-based vulcanization accelerator; a vulcanization activator such as stearic acid or zinc oxide; an organic peroxide; a reinforcing agent such as silica or carbon black; a filler such as calcium carbonate or talc; a silane coupling agent; an extender oil; a processing aid; an antioxidant; and a lubricant.

In the case where silica serving as the reinforcing agent is mixed in the composition of conjugated diene rubber of the present invention, the amount of silica is typically 10 to 200 parts by weight when the total amount of rubber components is 100 parts by weight. From the viewpoint of good fuel economy, the amount of silica is preferably at least 20 parts by weight, and more preferably at least 30 parts by weight. From the viewpoint of reinforcement being enhanced, it is preferably no greater than 180 parts by weight, and more preferably no greater than 150 parts by weight. For example, the silica can be synthetic amorphous silica such as those obtained by the acidification of a soluble silicate (e.g., sodium silicate or a co-precipitation of a silicate and an aluminate). Such precipitated silicas are, in general, well known to those having skill in such art. The BET specific surface area of the synthetic silica (precipitated silica), as measured using nitrogen gas, may be in a range of 50 to 300, alternatively 100 to 250, square meters per gram (m²/g), for example. The silica may also have a dibutylphthalate (DBP) absorption value in a range of for example, 100 to 500 cc/g, and preferably 120 to 350 cc/g. Various commercially available synthetic silicas, particularly precipitated silicas, may be considered for use in this invention, for example, but not limited to silicas commercially available from PPG industries under the trademark with designations 210, 243, etc., silicas available from Rhodia with designations of Zeosil 1165 MP and Zeosil 165GR, silicas available from EVONIK Industries with designations VN2, VN3, 7000GR and 9000GR, and silicas available from Huber with designations of Zeopol 8745.

When a reinforcing agent other than silica is combined with the composition of conjugated diene rubber of the present invention, from the viewpoint of reinforcement being enhanced, the amount of the reinforcing agent other than silica is preferably no greater than 120 parts by weight, and more preferably no greater than 100 parts by weight when the total amount of rubber components is 100 parts by weight. From the viewpoint of good fuel economy, it is preferably at least 1 part by weight, and more preferably at least 3 parts by weight. As the reinforcing agent other than silica, carbon black is a preferable specific example.

As a method for producing a composition of conjugated diene rubber by mixing another rubber component, an additive, etc. with the modified conjugated diene rubber of the present invention, a known method such as, for example, a method in which each component is kneaded by means of a known mixer such as a roll or a Banbury mixer or an internal mixer can be used. With regard to kneading conditions, when mixing an additive, fillers, silica and/or other reinforcing agent other than a vulcanizing agent or a vulcanization accelerator, the kneading temperature is normally 50° C. to 200° C., and preferably 80° C. to 150° C., and the kneading time is normally 30 seconds to 30 minutes, and preferably 1 minute to 30 minutes. When a vulcanizing agent or a vulcanization accelerator is combined, the kneading temperature is normally no greater than 00° C., and preferably room temperature (e.g. 25° C.) to 90° C. A composition in which a vulcanizing agent or a vulcanization accelerator is combined may be implemented by using a vulcanization treatment such as press vulcanization. The vulcanization temperature is normally 120° C. to 200° C., and preferably 140° C. to 180° C.

The modified conjugated diene rubber and the composition of conjugated diene rubber of the present invention are used for tires, soles, flooring materials, vibration isolating materials, etc., and are particularly suitable for tires, thereby enhancing the tire treads with low rolling resistance and high wet-skid resistance, resulting in better steering stability and reliability.

The polymerization process and modification process of the present invention will be described in details in reference to the following examples.

Example 1

Y is Nitrogen-Containing Group

An autoclave is provided, with an initial capacity of about 5 liters purged with nitrogen gas. The autoclave is then charged with 2750 grams of cyclohexane, 82.5 grams of tetrahydrofuran (THF), 100 grams of styrene, and 390 grams of 1,3-butadiene. Subsequently, 310 milligrams (4.80 mmoles) of n-butyl lithium as catalytically active ingredient for polymerization is added to initiate polymerization at 30° C. The polymerization is carried out in an adiabatic condition under the highest temperature of 83° C. When the polymerization is almost completed, 10 grams of 1,3-butadiene is added and the polymerization is continued for another 5 minutes. Then, 1.308 milligrams (9.60 mmoles) of trimethoxy (methyl)silane (also referred as M1) is added and the first stage modification is carried out for 10 minutes. Then, 1.28 grams (14.4 mmole) of dimethylaminoethanol (also referred as M2) is added and mixed for about 10 minutes. Then, 2,6-di-tert-butyl-p-cresol is added to the polymer solution to end the reaction. Next, a large amount of water is provided to contact the pretreated conjugated diene rubber, and then water and solvent are removed by means of any suitable hot source, in such a way, the solvent from the solution of polymer rubber is removed. For example, steam stripping is performed at 90° C. for 3 hours, wherein the weight ratio of water and solvent is at least 1; the PH value is between 6 and 10. Then, a hot roll drying process is performed at 110° C. to obtain the modified conjugated diene rubber, which is defined as Example 1 rubber. The molar ratio of first modifier and second modifier of Example 1 to conjugated diene rubber-lithium, initial molecular weight (Mi), and various properties of the resulted product are shown in Table 1.

Example 2

Y is nitrogen-Containing Group

The polymerization procedure of Example 2 is basically similar to that of Example 1; for the sake of simplicity and concise, the same description therefore is omitted. That is, Example 2 uses same solvent and reactants as Example 1, but different amount of reactants. The reaction conditions of each example, such as the molar ratio of modifier to conjugated diene rubber-lithium, initial molecular weight (Mi), and various properties of the resulted product, have been shown in Table 2.

Examples 3-4

Y is Oxygen-Containing Group

The polymerization procedures of Examples 3-4 are basically similar to that of Example 1, except for the type of second modifier used. That is, the second modifier of Examples 3-4 is 3-methoxyphenol (also referred as M3). For the sake of simplicity and concision, the same description therefore is omitted. The reaction conditions of each example, such as the molar ratio of first modifier and second modifier to conjugated diene rubber-lithium, initial molecular weight (Mi), and various properties of the resulted product, have been shown in Table 2. Examples 3 and 4 use same solvent and reactants, but different amount of reactants.

Comparative Example 1

The polymerization procedure of Comparative Example 1 is basically similar to that of Example 1, for the sake of simplicity and concision, the same description therefore is omitted. For modification, 0.327 milligrams (2.40 mmoles) of Trimethoxy(methyl)silane (M1) is used and the modification is carried out for 10 minutes. Then, no second modifier has been added, but 2,6-di-tert-butyl-p-cresol is added to the polymer solution to end the reaction. After removal of solvent from the solution of polymer rubber, a hot roll drying process is performed at 110° C. to obtain the modified conjugated diene rubber, which is defined as Comparative Example 1 rubber. The molar ratio of modifier of Comparative Example 1 to conjugated dime rubber-lithium, initial molecular weight (Mi), and various properties of the resulted product haven been shown in Table 1.

Comparative Examples 2 and 3

The polymerization procedures of Comparative Examples 2 and 3 are basically similar to that of Comparative Example 1, except the type of reactants used. For the sake of simplicity and concision, the same description therefore is omitted. In particular, Comparative Example 1 uses Trimethoxy(methyl)silane (M1) as the modifier, while Comparative Example 2 uses tetraethoxysilane (TEOS) as the modifier; Comparative Example 3 uses tetramethoxysilane (TMOS) as the modifier. The molar ratio of modifier of each comparative example to conjugated diene rubber-lithium, initial molecular weight (Mi), and various properties of the resulted product have been shown in Table 1.

Hereafter, a method of testing loss tangent of a vulcanized sheet made from the composition of conjugated diene rubber obtained from each example will be described.

100 parts by weight of each example rubber, 78.4 parts by weight of silica (product name: Ultrasil 7000GR, manufactured by EVONIK industries), 6.9 parts by weight of a silane coupling agent (product name: Si69, manufactured by EVONIK Industries), 50.0 parts by weight of an extender oil (product name: TDAE, manufactured by IRPC Industries), 1.5 parts by weight of an antioxidant (product name: Antigene 3C), 2 parts by weight of stearic acid, 2 parts by weight of zinc oxide, 1.5 parts by weight of a wax, 1.4 parts by weight of sulfur, and 2 parts by weight of a vulcanization accelerator (1 part by weight each of product names CZ and D) are kneaded to give a composition. The composition thus obtained is molded into a sheet using a two roll machine; the sheet is heated at 160° C.' for 45 minutes to effect vulcanization, and thus a vulcanized sheet is obtained.

A loss tangent at 60° C. (tan δ (60° C.)) of the vulcanized sheet is measured using a viscoelastometer under conditions of a strain of 1% and a frequency of 10 Hz. Based on the comparative example 2 as standard, let Comparative Example 2 set as 100%, the higher value of the examples, the better effect of fuel economy. A loss tangent at 0° C. (tan δ (0° C.)) of the vulcanized sheet is measured using a viscoelastometer under conditions of a strain of 0.5% and a frequency of 10 Hz. Based on the comparative example 2 as standard, let Comparative Example 2 set as 100%, the higher value of the examples, the better effect of safety on gripping and braking. The loss tangent of the vulcanized sheet of each example is shown in Table 1 and Table 2.

TABLE 1

|  | Example 1 | Comparative Example 1 | Comparative Example 2 | Comparative Example 3 |
|---|---|---|---|---|
| First Modifier | M1 | M1 | TEOS | TMOS |
| First Modifier/Conjugated diene rubber-Lithium (mole ratio) | 2.0 | 0.5 | 1.0 | 1.0 |
| Second Modifier | M2 | — | — | — |
| Second Modifier/Conjugated diene rubber-Lithium (mole ratio) | 3.0 | — | — | — |
| Initial Molecular Weight (Mi, 10 kg/mole) | 26.3 | 26.0 | 24.3 | 23.7 |

TABLE 1-continued

|  | Example 1 | Comparative Example 1 | Comparative Example 2 | Comparative Example 3 |
|---|---|---|---|---|
| Coupling Ratio (polymer solution) % | 19 | 58 | 19 | 41 |
| MV(after direct hot roll de-solvent) | 49 | 71 | 46 | 54 |
| Coupling Ratio (after steam stripping and drying) % | 55 | 61 | — | — |
| MV (after steam stripping and drying) | 75 | 61 | — | — |
| MV (after storage test) | 76 | 62 | 53 | 91 |
| Styrene Content % | 20 | 21 | 21 | 21 |
| Vinyl Content % | 63 | 63 | 64 | 63 |
| Tg ° C. | −23 | −24 | −23 | −24 |
| Akron Abrasion (Idex) | 115 | 120 | 100 | 105 |
| tan δ (0° C.) | 164 | 155 | 100 | 103 |
| tan δ (60° C.) | 132 | 94 | 100 | 104 |

TABLE 2

|  | Example 2 | Example 3 | Example 4 |
|---|---|---|---|
| First Modifier | M1 | M1 | M1 |
| First Modifier/Conjugated diene rubber-Lithium (mole ratio) | 2.0 | 2.0 | 2.0 |
| Second Modifier | M2 | M3 | M3 |
| Second Modifier/Conjugated diene rubber-Lithium (mole ratio) | 2.0 | 3.0 | 2.0 |
| Initial Molecular Weight (Mi, 10 kg/mole) | 26.0 | 26.0 | 26.1 |
| Coupling Ratio (polymer solution) % | 31 | 32 | 31 |
| MV (after direct hot roll de-solvent) | 58 | 56 | 58 |
| Coupling Ratio (after steam stripping and drying) % | 69 | 68 | 73 |
| MV(after steam stripping and drying) | 80 | 80 | 80 |
| MV(after storage test) | 82 | 81 | 82 |
| Styrene Content % | 20 | 20 | 20 |
| Vinyl Content % | 63 | 63 | 63 |
| Tg ° C. | −24 | −24 | −24 |
| Akron Abrasion (Idex) | 172 | 133 | 175 |
| tan δ (0° C.) | 110 | 111 | 119 |
| tan δ (60° C.) | 106 | 106 | 105 |

The Akron abrasion represents wear resistance; tan δ (0° C.) represents wet-skid resistance; tan δ (60° C.) represents rolling resistance, wherein the higher value indicates the better performance.

In Table 1 and Table 2, the Mooney viscosity (MV) is measured under the conditions of 1 minute preheating and prolonged 4 minutes at 100° C. The Mooney Viscosity can be measured after modification and removal of solvent (referred as direct de-solvent), after steam stripping and mechanical drying (referred as after steam stripping and drying), and after storage test at a temperature of 90° C., relative humidity of 80%, and 40 hours storage (referred as after storage test). The values of MV (after steam stripping and drying) and MV (after storage test) are almost similar, that indicates the stability improvement of Mooney viscosity. The coupling ratio (C/R %) which refers to the ratio of polymers with molecular weight higher than those of uncoupled to the molecular weight of total polymers can be measured with gel permeation chromatography (GPC) equipped with refractive index detector. During measurement, tetrahydrofuran acts as a mobile phase. The coupling ratio can be measured after modification under the polymer solution condition (referred as polymer solution), after steam stripping and mechanical drying (referred as after steam stripping and drying). Microstructure properties (e.g. styrene content, 1,2-vinyl content) can be measured by any suitable known techniques, such as Fourier transform infrared spectroscopy (FTIR). The Akron abrasion (Idex) is tested using an Akron abrasion tester under load of 6 pounds, 3300 rpm; higher Idex value indicates better wear resistance.

While the invention has been described by way of examples and in terms of preferred embodiments, it would be apparent to those skilled in the art to make various equivalent replacements, amendments and modifications in view of specification of the invention. Therefore, the scope of the appended claims should be accorded the broadest interpretation so as to encompass all such replacements, amendments and modifications without departing from the spirit and scope of the invention.

The invention claimed is:

1. A method for producing a modified conjugated diene rubber, comprising:
   (a) reacting an alkali metal ion-containing conjugated diene rubber with a first modifier having a structural formula (I):

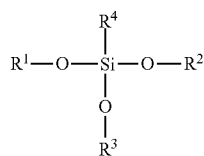
(I)

wherein $R^1$, $R^2$, $R^3$ are each independently selected from the group consisting of $C_1$-$C_{12}$ of alkyl, $C_2$-$C_{12}$ of alkenyl groups and $C_6$-$C_{12}$ of aromatic group, and $R^4$ is selected from the group consisting of $C_1$-$C_{12}$ of alkyl, $C_2$-$C_{12}$ of alkenyl, $C_1$-$C_{12}$ of alkoxy groups and $C_6$-$C_{12}$ of aromatic group;

(b) adding a second modifier having a structural formula (II) after the step (a),

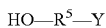

wherein $R^5$ is selected from the group consisting of $C_1$-$C_{12}$ of alkylene, $C_2$-$C_{12}$ of alkenylene, $C_3$-$C_{12}$ of alicyclic groups and $C_6$-$C_{12}$ of aromatic group, and Y is selected from the group consisting of oxygen-containing $C_1$-$C_{12}$ group and nitrogen-containing $C_1$-$C_{12}$ group, wherein Y has the oxygen atom or the nitrogen atom directly connected to a carbon atom of $R^5$;

(c) adding water before, after, or during the step (b); and reacting a hydrolysis product obtained from the step (c) with the second modifier (II) to produce the modified conjugated diene rubber.

2. The method as claimed in claim 1, wherein Y has an alkyl, alkenyl, or aromatic group connected to the oxygen atom or the nitrogen atom.

3. The method as claimed in claim 1, wherein $R^1$, $R^2$, $R^3$ are each independently selected from the group consisting of methyl, ethyl and propyl groups.

4. The method as claimed in claim 1, wherein $R^4$ is selected from the group consisting of methyl, ethyl and propyl groups.

5. The method as claimed in claim 1, wherein the second modifier is 3-methoxyphenol or dimethylaminoethanol.

6. The method as claimed in claim 1, wherein the molar ratio of the first modifier to the alkali metal ion-containing conjugated diene rubber is ≥0.5.

7. The method as claimed in claim 1, wherein the molar ratio of the second modifier to the alkali metal ion-containing conjugated diene rubber is ≥0.5.

8. The method as claimed in claim 1, wherein the treatment of the step (c) includes steam stripping.

9. The method as claimed in claim 1, wherein the initial number-average molecular weight of the alkali metal ion-containing conjugated diene rubber before reacting with the first modifier is in a range of 80 kg/mole to 2000 kg/mole.

10. The method as claimed in claim 1, wherein the coupling ratio of the modified conjugated diene rubber after the step (c) is 10%-95%.

11. A modified conjugated diene rubber produced by the method as claimed in claim 1.

12. A composition of conjugated diene rubber, comprising:
   the modified conjugated diene rubber as claimed in claim 11; and
   a silica.

13. The composition as claimed in claim 12, wherein when the total amount of rubber components of the composition is 100 parts by weight, the modified conjugated diene rubber is at least 10 parts by weight.

14. The composition as claimed in claim 12, wherein when the total amount of rubber components of the composition is 100 parts by weight, the silica is 10 to 200 parts by weight.

15. A modified conjugated diene rubber, the modified conjugated diene rubber represented by the following structural formula (III) or (IV):

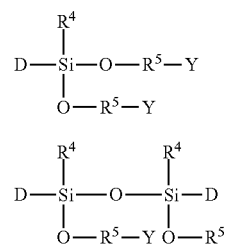

wherein:
   D is a polymer chain of conjugated diene monomer or of conjugated diene monomer and vinyl aromatic hydrocarbon monomer;
   $R^4$ is selected from the group consisting of $C_1$-$C_{12}$ of alkyl, $C_2$-$C_{12}$ of alkenyl, $C_1$-$C_{12}$ of alkoxy groups, and $C_6$-$C_{12}$ of aromatic group;
   $R^5$ is selected from the group consisting of $C_1$-$C_{12}$ of alkylene, $C_2$-$C_{12}$ of alkenylene, $C_3$-$C_{12}$ of alicyclic groups and $C_6$-$C_{12}$ of aromatic group; and
   Y is selected from the group consisting of oxygen-containing $C_1$-$C_{12}$ group and nitrogen-containing $C_1$-$C_{12}$ group, wherein Y has the oxygen atom or the nitrogen atom directly connected to a carbon atom of $R^5$.

16. The modified conjugated diene rubber as claimed in claim 15, wherein Y has an alkyl, alkenyl, or aromatic group connected to the oxygen atom or the nitrogen atom.

17. The modified conjugated diene rubber as claimed in claim 15, wherein $R^4$ is selected from the group consisting of methyl, ethyl and propyl groups.

18. The modified conjugated diene rubber as claimed in claim 15, wherein —O—$R^5$—Y in the structural formula (III) and the structural formula (IV) is —O—($C_6H_4$)—$OCH_3$ or —O—$CH_2CH_2N(CH_3)_2$.

19. The modified conjugated diene rubber as claimed in claim 15, wherein the modified conjugated diene rubber has been treated by contacting water.

20. A composition of conjugated diene rubber, comprising:
the modified conjugated diene rubber as claimed in claim 15; and
a silica.

21. The composition as claimed in claim 20, wherein when the total amount of rubber components of the composition is 100 parts by weight, the modified conjugated diene rubber is at least 10 parts by weight.

22. The composition as claimed in claim 20, wherein when the total amount of rubber components of the composition is 100 parts by weight, the amount of the silica is 10 to 200 parts by weight.

* * * * *